UNITED STATES PATENT OFFICE.

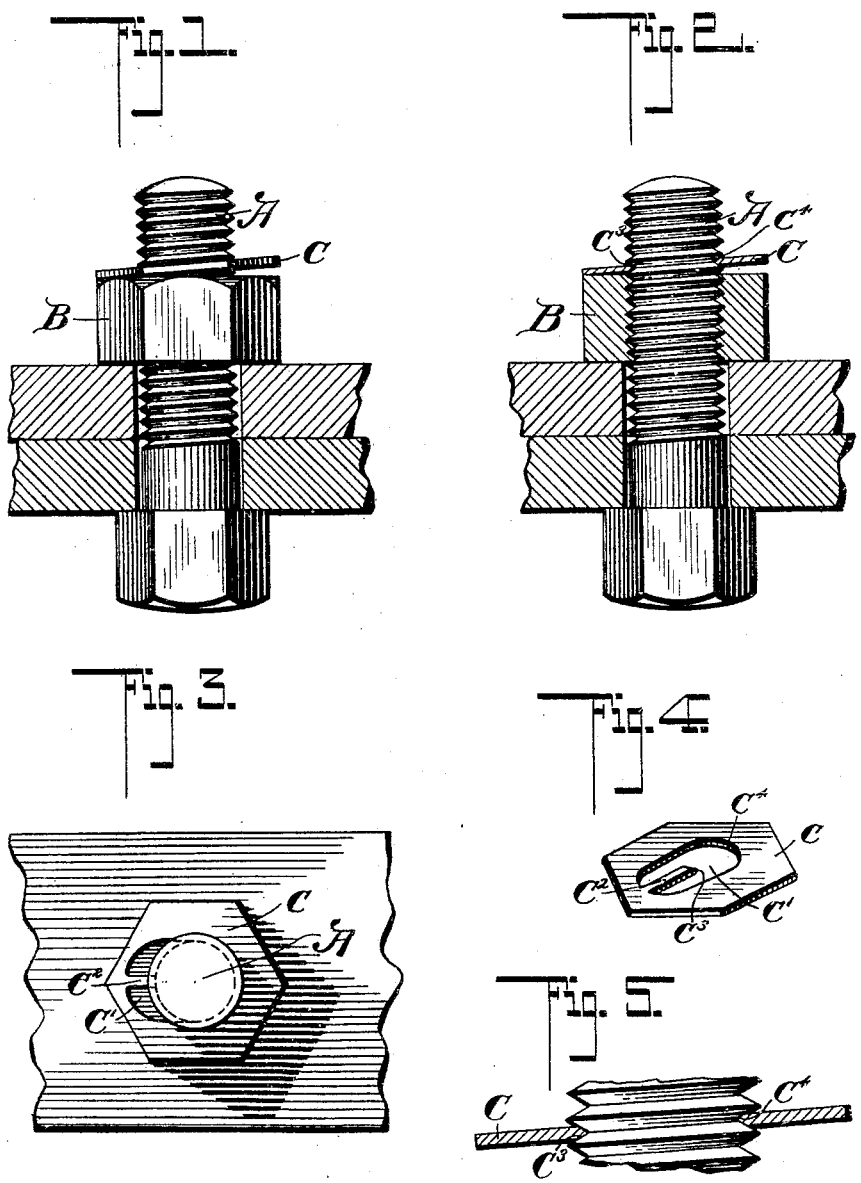

GEORGE BRYAR, OF BRIGHTON, MASSACHUSETTS, ASSIGNOR OF ONE-THIRD TO STUART M. ROBSON AND ONE-THIRD TO ARTHUR C. HARVEY, BOTH OF SPRINGFIELD, MASSACHUSETTS, AND ONE-THIRD TO FRANKLIN PLAYTER, OF BOSTON, MASSACHUSETTS.

NUT-LOCK.

No. 929,827.     Specification of Letters Patent.     Patented Aug. 3, 1909.

Application filed April 18, 1908. Serial No. 427,848.

*To all whom it may concern:*

Be it known that I, GEORGE BRYAR, a citizen of the United States of America, residing at Brighton, in the county of Suffolk and State of Massachusetts, have invented a new and useful Improvement in a Nut-Lock, of which the following is a specification.

This invention is an improved construction of nut lock, the object being to provide an exceedingly simple and inexpensive construction of nut lock and which can be quickly and easily applied and prove highly efficient.

Another object of the invention is to provide a nut lock which is applied after the nut has been screwed home and which will bind against the said nut and prevent it working loose.

With these objects in view, my invention consists essentially in providing a thin washer-plate having an opening larger than the cross-section of the bolt, said washer-plate having an inwardly projecting tongue or finger at one side of the opening, said finger being adapted to engage the thread of the bolt and hold the opposite side of the washer opening also in engagement with the bolt, said washer being held at an inclination to the face of the nut against which it is caused to bear, thereby firmly binding the said nut upon the bolt.

The invention consists also in certain details, hereinafter fully described and pointed out in the claims.

In the drawing forming a part of this specification:—Figure 1 is a side elevation of my improved construction of nut lock. Fig. 2 is a vertical sectional view of the same, the bolt being shown in elevation. Fig. 3 is a top plan view of the same. Fig. 4 is a detail perspective view of the locking washer and Fig. 5 is an enlarged sectional view, a portion of the bolt being shown in elevation, said view illustrating the oblique position of the washer with reference to the bolt.

Referring to the drawings A indicates the bolt and B the nut, both being of the usual or any approved construction. The nut is ordinarily screwed down tight upon the bolt and the locking washer C is then placed upon the bolt and turned down until it firmly binds against the face of the nut upon one side, and when so brought into engagement with the face of the nut, the nut, bolt and washer are all securely bound together and all tendency of the nut to work loose arrested, the action of the locking washer depending entirely upon the fact that it extends at an oblique angle with reference to both the bolt and the nut, and binds tightly upon the thread of the bolt and also against the face of the nut.

The locking washer C is preferably made substantially the same size as the nut and also of the same shape, although it will be understood that the washer can be any shape desired. This locking washer C is a thin plate preferably of hardened steel, and has an opening C' essentially oval or elliptical in shape, and a finger or tongue $C^2$ projects inwardly from one edge of said opening, said finger or tongue being in alinement with the major axis of the opening, and the inner end of this finger or tongue is preferably beveled as shown at $C^3$, in order to engage the threads of the bolt and the opposite edge $C^4$ of the opening is also beveled for the same reason.

In operation the locking washer is placed upon the bolt and turned down until it contacts with the nut as shown in Figs. 1 and 2, and inasmuch as one side of the washer opening engages the bolt upon one side, and the finger or tongue engages the bolt at a diametrically opposite point it is obvious that owing to the pitch of the screw or thread, the locking washer will always be held at an oblique angle, and by turning the said washer down firmly, the bolt and nut and washer will be securely locked, as the resiliency of the finger or tongue will always hold said tongue firmly bound against the bolt and this will also hold the opposite edge firmly in contact with the opposite side of the bolt, and all tendency of the nut to loosen will be avoided.

Having thus fully described my invention, what I claim as new and desire to secure by Letters Patent is:—

1. A locking washer consisting of a thin plate of metal having an opening and provided with a finger at one side of said opening in the same plane as the washer, the inner end of said finger being adapted to engage the threads of a bolt whereby said washer will be held into engagement with the outer face of the nut to be locked at an oblique angle.

2. A locking washer consisting of a thin flat plate of metal having an opening, and an inwardly projecting finger arranged at one side of said opening in the same plane as the washer, the inner end of said finger being beveled for engagement with the thread of a bolt, the opposing edge of the opening being also beveled, whereby said washer will be held on the bolt at an oblique angle.

3. A locking washer comprising a plate provided with a substantially oval-shaped opening having an inwardly projecting finger at one end of the opening normally held in the same plane as the washer, the inner end of said finger and the opposite edge of said opening being beveled and adapted to engage the threads of a bolt and be held against the face of the nut at their inclination.

GEORGE BRYAR.

Witnesses:
GEORGE W. SIAS,
E. C. BULLEN.